Aug. 24, 1965
L. B. JOHNSTON
3,202,061
FLUID ACTUATED DISPLACEMENT AND POSITIONING SYSTEM
Filed July 9, 1962
2 Sheets-Sheet 1
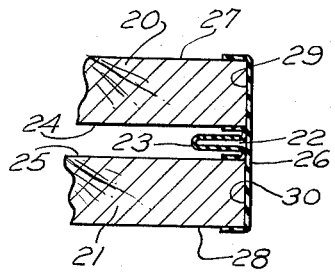
FIG. 1
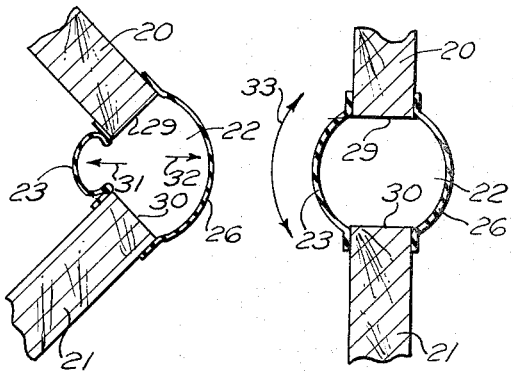
FIG. 2
FIG. 3
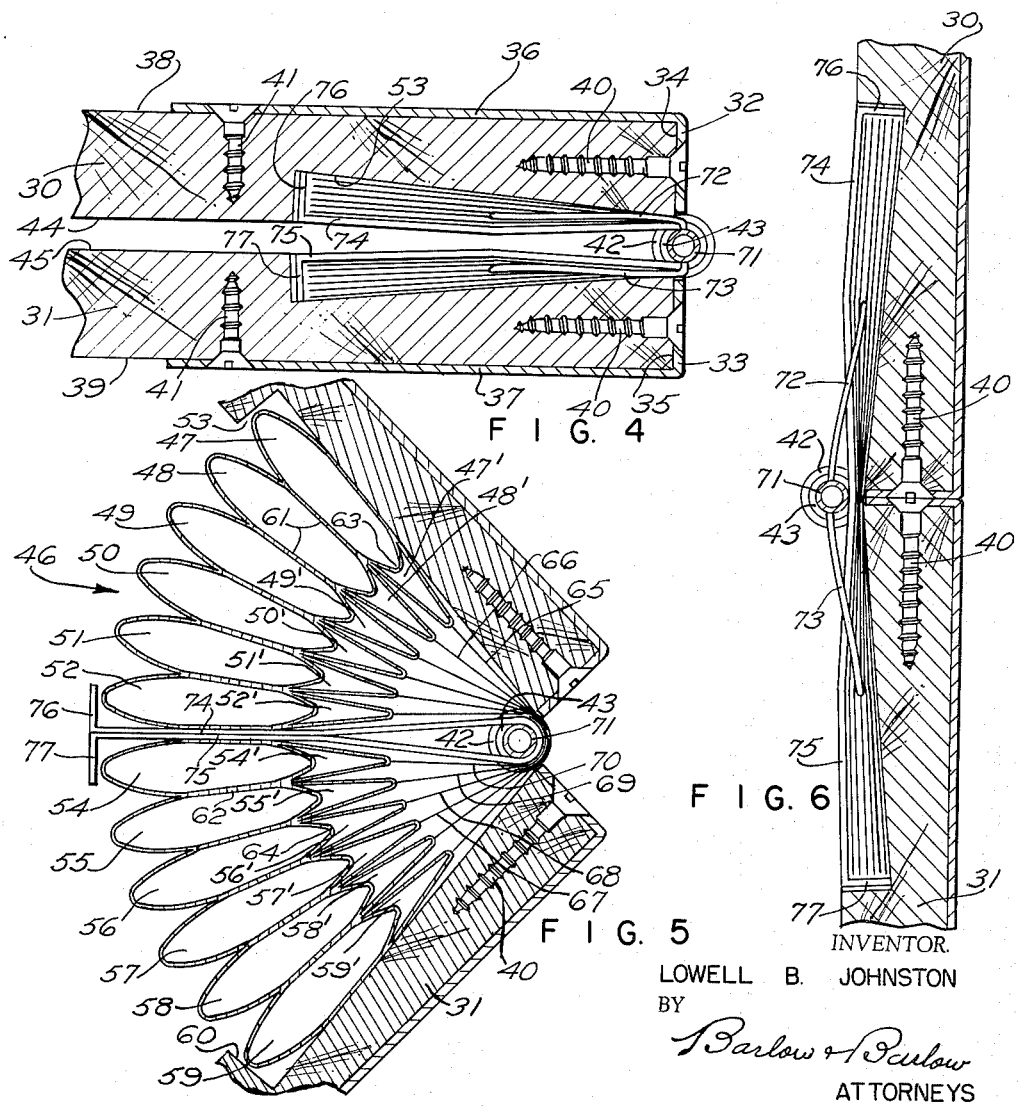
FIG. 4
FIG. 5
FIG. 6
INVENTOR.
LOWELL B. JOHNSTON
BY
Barlow & Barlow
ATTORNEYS Aug. 24, 1965         L. B. JOHNSTON         3,202,061
FLUID ACTUATED DISPLACEMENT AND POSITIONING SYSTEM
Filed July 9, 1962                              2 Sheets-Sheet 2

INVENTOR.
LOWELL B. JOHNSTON
BY
Barlow & Barlow
ATTORNEYS

United States Patent Office 3,202,061
Patented Aug. 24, 1965

3,202,061
FLUID ACTUATED DISPLACEMENT AND POSITIONING SYSTEM
Lowell B. Johnston, 39 Bowen St., Providence, R.I.
Filed July 9, 1962, Ser. No. 208,527
7 Claims. (Cl. 92—37)

This invention relates to a system or construction in which two elongated rigid members may be relatively moved from one position to another.

One of the objects of this invention is to provide a power means by which relatively large and unwieldly members may be moved from one position to another.

Another object of the invention is to provide a control and power means for relative movement of two members so that they may be moved from one position to another.

Another object of the invention is to provide for the movement of two members by some fluid power means which may be conveyed through a conduit for the actuation of the members.

A more specific object of the invention is to provide some sort of an expandable chamber which may be used for the actuation of the members to move the same along a controlled path.

With these and other objects in view, the invention consists of certain novel features of construction as will be more fully described and particularly pointed out in the appended claims.

In the accompanying drawings:

FIGS. 1, 2 and 3 are diagrammatic end views to illustrate a simple form of the invention showing the members in three different relative positions;

FIG. 4 is a sectional view illustrating two hinged members in collapsed condition;

FIG. 5 is a view similar to FIG. 4 but illustrating the members as having been moved about their hinge by fluid pressure in a plurality of chambers;

FIG. 6 is a similar view illustrating the members as in aligned relation in which position they may be locked and with the chambers deflated and housed within the members similar to the housing in FIG. 4;

Figure 7:
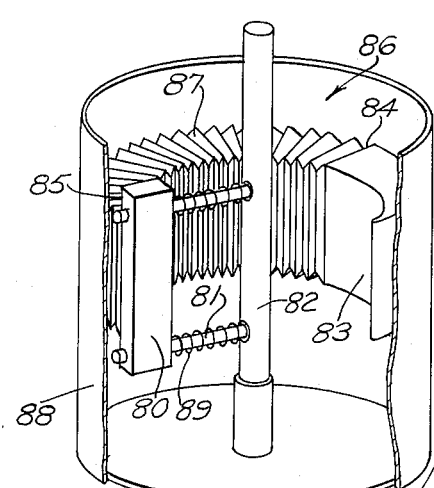
FIG. 7 is a perspective view partly broken away of a modified form of the invention.

In proceeding with this invention, I have provided a plurality of rigid elongated members such as might be a part of some collapsible structure of considerable size, such for instance as a trailer, and have positioned between two of these members a chamber which has flexible walls. In some cases this structure may provide a hinge and in other cases may be supplemental to a hinge, the arrangement being such that upon placing in this chamber some fluid under pressure, the chamber tends to expand and exerts a force on the member so as to relatively move them into some position which it is desired that they assume. Various means of supplying the chamber with fluid may be had, in some cases the separate hinge of tubular form being utilized for this purpose. In some cases the chamber may have multiple cells or compartments, and the expansion may occur by connecting the compartments together so that as one compartment fills, the fluid will spill over into the next compartment and so on until all of the chambers are substantially completely under pressure.

With reference to the drawings and particularly FIGS. 1, 2 and 3, there are a pair of rigid members 20 and 21 which are shown in three relative positions which they may assume. The rigid members 20 and 21 may be a part of some collapsible structure which it is desired should be expanded by some mechanical means to accomplish the expansion. In this simplified form of the invention, there is a chamber 22 provided and located at the extremities of these two members. The chamber is provided by flexible walls 23 connected to the surfaces 24 and 25 of the members 20 and 22 which are closest together and a flexible wall 26 connected to the surfaces 27 and 28 of the members which are most distant from each other. This chamber 22 is so constructed as to be a sealed chamber and may run along the two extremities 29 and 30' of these members for the entire lengths thereof or may be divided to intermittently extend along portions of the end extremities.

With a construction such as described in FIG. 1, in order to cause a swinging movement of the members 20 and 21, a fluid pressure such for instance as air may be inserted into the chamber 22 whereupon when pressure is applied to the flexible walls 23 and 26, they will cause a movement of the members 20 and 21 to be had to an intermediate position shown in FIG. 2 such that members 20 and 21 are substantially 90° apart. The arrow 31' illustrates the pressure which is applied to the flexible wall 26, and the arrow 32' illustrates the pressure which is applied to the wall 23 so as to cause this relative movement of the members to occur. If the pressure is continued to be applied by further injection of the fluid into the chamber, the movement will continue in the direction indicated by the arrows 33' so that the members 20 and 21 will be moved to the position shown in FIG. 3 where the chamber walls 23 and 26 then are in substantially a balanced relation, and no further movement will occur, the members 20 and 21 then being substantially aligned in the plane of their center line and opposite surfaces of the members being substantially 180° apart.

In FIGS. 4, 5 and 6 the relatively movable members 30 and 31 are connected together by a hinge comprising right angular shaped plates having portions 32 and 33 extending along the edges 34 and 35 of the members 30 and 31 with portions 36 and 37 extending along their outer faces 38 and 39. These plates are secured in position by screws 40 and 41. Each of these hinge plates 32 and 33 is provided with rolled eyes 42 which are spaced and interleaved with each other to wrap about a bushing 43 which bushing embraces the tubular pintle pin 71. The hinge plates 32 and 33 may be of relatively short length and spaced along the length of the members 30 and 31 at intervals, there being a sufficient number to properly support the members and the number varying with the length of the members. The tubular pintle 71 will extend the length of the members 30, 31 and will extend through all of the hinge eyes 42 and serve as a retainer between the hinges as will be pointed out. Between the inner faces 44 and 45 of the members 30 and 31, there is located a multicellular member designated generally 46 (see FIG. 5). This multicellular member as shown in FIG. 5 comprises a plurality of chambers 47, 48, 49, 50, 51 and 52 which are located in a recess 53 in a member 30 while there is a similar group of chambers 54, 55, 56, 57, 58 and 59 located in a recess 60 in member 31. The chambers 47–52 are connected together by small openings 61 between the chambers, and the chambers 54–59 are connected together by small openings 62 between the chambers. Auxiliary chambers are connected to each of the main chambers. Thus, there are auxiliary chambers 47', 48', 49', 50', 51' and 52' connected with each of the chambers 47–52 by means of openings 63 extending from each main chamber to its auxiliary chamber, which is of the same numeral with a prime added. Likewise, there are auxiliary chambers 54', 55', 56', 57', 58' and 59' connected to each of the main chambers 54–59 by a small opening 64. The outermost auxiliary chambers 47' and 59' are connected together by a web 65 extending from one auxiliary chamber back of the hinge pintle 71, as likewise there are additional webs 66 connecting auxiliary chambers 48' and 58', 67 connecting chambers 49' and 57', web 68 connecting chambers 50' and 56', a web 69 connecting chambers 51' and 55' and a web 70 connecting chambers 52' and 54'. These webs serve to retain the chambers in place back of the pintle pin 71 as seen in FIG. 5. The tubular pintle pin 71 extends the full length of the members from hinge to hinge and from one multicellular member 46 to another multicellular member, while extending from this tube 71 there are branch tubes 72 and 73 connected to one of the cells of the chamber, such for instance as 49 or 52 in one group or 54 or 56 in the other group. Cover plates 74 and 75 are also hinged about the pintle so as to close in over the chambers when in collapsed condition such as shown in FIGS. 4 and 6 and have lips to extend over and protect the flexible multicellular members as shown at 76 and 77.

I prefer to use air as the actuating pressure medium and will supply that air through the tubular member 71 extending the length of the members 30 and 31. This air will serve to first pass into one of the chambers causing it to urge the cover plates outwardly into contact such as shown in FIG. 5, and thereafter as the chambers are successively inflated, the members will be urged further and further apart as the chambers expand. The main chambers are arranged to do the primary actuating of the members 30 and 31 and will force these members apart relatively about their hinge connection from the position shown in FIG. 4 to the position shown in FIG. 5 and then on until the members are 180° apart such as shown in FIG. 6. When the members 30 and 31 are in this relationship, they may be locked by some suitable means in this relative position, and the chambers may then be deflated and moved back into their recesses 53 and 60 and the cover plates placed thereover. The auxiliary chambers 47'–52' and 54'–59' are utilized in case any mishap should occur to the main members such, for instance, as a rupture so that the entire multicellular member will not collapse at one time but will be slowly collapsed by reason of the necessity of the air to pass out through each of the smaller opening 63. The passageway between the main chambers will also serve this same function should one main cell and this multicellular member be ruptured, particularly where the chamber was utilized for continually supporting the relative position of the members when there is no locking of the two members in an assumed relation. This arrangement is also convenient for more slowly collapsing the members where they are of a heavy construction and it is desired that the members be slowly moved toward each other.

In another embodiment it may be desirable to provide a structure which will move through an arc of a smaller angle or even greater than 360°. In this event one of the members designated as 80 (FIG. 7) is shown as slidably mounted upon a pair of radius rods 81 extending from a central axis or post 82, while the other member designated 83 is of a height less than the distance between these radius rods and has between its edge 84 and the edge 85 of the member 80, a multiple cell chamber 86 formed of several cells 87 so that upon inflation of this chamber 86, the member 83 may be caused to move circularly about the guiding cylindrical container 88 so that its thinned edge may pass outwardly beyond and overlap the member 80, forcing the member 80 inwardly against the spring 89 encircling rods 81 if necessary, thus causing member 83 to move more than 360° if desired, thus providing an arrangement so that an unusually great travel about a center point may be had.

Figure 8:
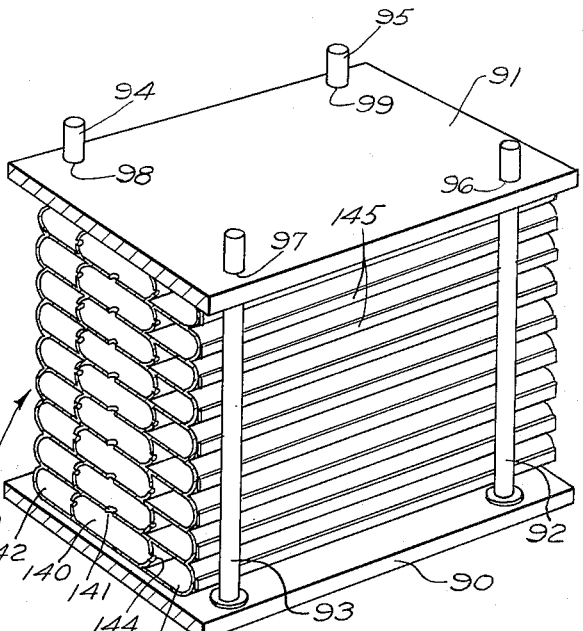
FIG. 8 is a perspective view in section of a still different modified form.

In FIG. 8 one of the rigid members is 90 and the other rigid member is 91. These are in generally parallel relation with guide rods such as 92, 93, 94 and 95 fixed in the member 90 but slidably guided through openings 96, 97, 98 and 99 in the member 91. A multicellular chamber 100 is located between these members and is of a construtcion so that when inflated with a fluid, pressure is exerted on the members 90 and 91 to move them relatively in opposite directions. This chamber 100 is provided by extrusion to form a series of center cells 140 with small opening 141 between with each center cell having an auxiliary end cell 142, 143 also connected to the main cell 140 by an opening 144. The end of the cells will be closed, and a fluid conduit will lead to the center cell. A semi-rigid batten 145 extends along each end cell to engage the guide rods for rubbing engagement therewith and also to retard outward bulging of the cells between the guide rods.

Figure 10:
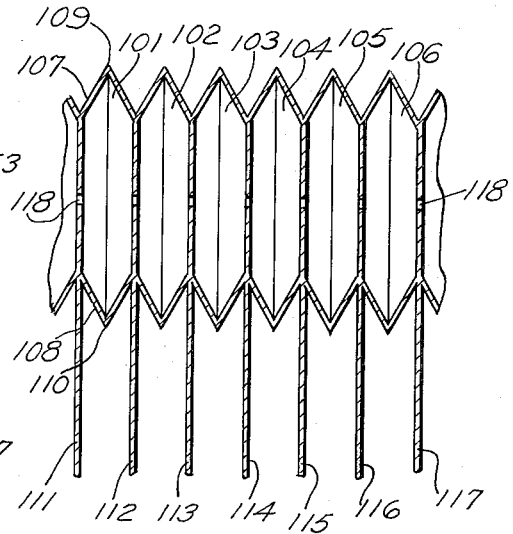
FIG. 10 is a view similar to FIG. 9 but illustrating the expansible chambers in a different modified form.

The chamber with a plurality of cells may be variously formed. In FIG. 10 I have shown a single wall structure extruded so as to provide a plurality of cells 101, 102, 103, 104, 105, 106, etc., completely closed by end and side walls such as 107 and 108 shaped at their ends to have points such as 109 and 110. Walls or webs 111, 112, 113, 114, 115, 116, 117 are continuations of the walls between the cells which may serve the same purpose as the webs 66–69 in the similar chamber of FIG. 5. Some sort of an opening such as 118 in the chambers 101–106 may be utilized for the passage of fluid from one main chamber to the next main chamber. The principle here will be the same as that in FIG. 5 as to the connection between the chambers.

Figure 11:
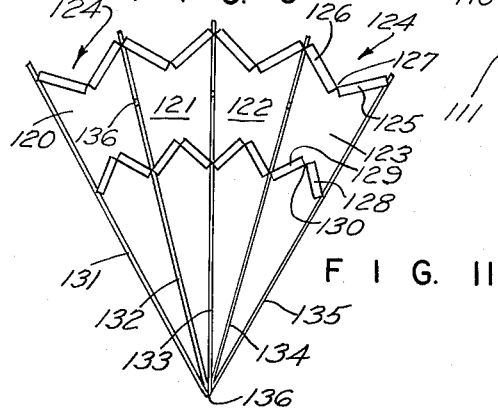
FIG. 11 is a view similar to FIGS. 9 and 10 illustrating the chambers in still a different form.

In some cases a still different structure of chamber may be provided such as shown in FIG. 11. Here there are chambers 120, 121, 122, 123 with end walls 124 each provided in two relatively rigid sections 125 and 126. A thinned place between the setcions as at 127 acts as a hinge so that as pressure is applied and the walls 124 are moved outwardly, there will be sort of a toggle action so that when the stiff sections come together or just beyond aligning in a single plane, they will by reason of a toggle action maintain the walls of the cells in this position. Similar stiffened parts 128 and 129 with a hinge as at 130 serve as a similar closure for the other ends of the cells 120–123. The angle between section 125 on the outer wall of the cell 123 and the angle between section 128 and this wall will be the same, and similar like angles will be between sections 126 and 129 and the wall of the cell to which they are attached. In this case also webs 131, 132, 133, 134, 135 extend from the juncture of the chambers serving as do the webs 66–70. Restricted openings 136 connect the main chambers.

Figure 9:
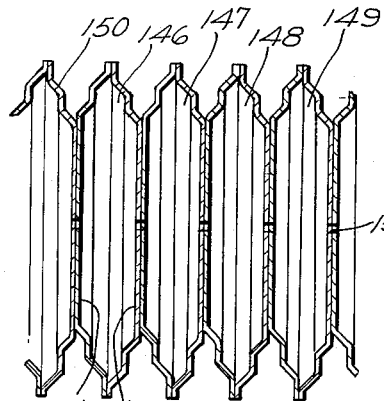
FIG. 9 is a detailed fragmental view showing chambers by themselves of a modified form from that heretofore shown.

In some cases the chambers may be made of metal, and this is illustrated in FIG. 9 where there are a plurality of cells 146, 147, 148, 149 formed of thin material such as beryllium copper which is rather thin and provided with corrugated ends as at 150. The walls 151 and 152 may be brought together by reason of the resiliency of the corrugated ends 150 so as to nest, and when pressure is applied to the cell, the cell may expand by the walls moving apart to the position shown in FIG. 9. Openings 153 through the walls of the cells serve to connect one to another. The side walls 151 and 152 are, however, flat so that a plurality of these sections may be positioned together in face to face relation, and in such connected relation act as a plurality of cells for a chamber in the manner provided by the description of the chambers heretofore and above described.

It will be understood that the chambers may be separately constructed and applied as a unit to the parts or members which it is to actuate.

I claim:

1. A fluid actuated displacement and positioning system comprising
   (a) a pair of substantially rigid elongated members in juxtaposition,
   (b) guide means to direct relative movement of the members,
   (c) a closed chamber comprising a plurality of cells having flexible walls extending between and attached to one of said members, and free of the other member, said flexible wall being so related to said members as to exert a force thereon when said chamber is subjected to fluid pressure, and
   (d) inlet means to introduce a fluid media into said chamber to exert an internal pressure on the wall thereof to move them and the members in their guided path.

2. A fluid actuated displacement and positioning system as in claim 1 wherein
   (a) hinges connect the members to guide their movement in hinging relation.

3. A fluid actuated displacement and positioning system as in claim 1 wherein
   (a) hinges connect the members to guide their movement in hinging relation, and
   (b) a web extends about the hinge and is connected at one end to one cell and at its other end to a different cell of said chamber.

4. A fluid actuated displacement and positioning system as in claim 1 wherein
   (a) the cells are interconnected by passages between them.

5. A fluid actuated displacement and positioning system as in claim 1 wherein
   (a) the chamber is comprised of a plurality of main cells interconnected by pasages between them, and
   (b) auxiliary cells, one auxiliary cell being adjoining each main cell and having a lesser area passageway connecting it to the main cell.

6. A fluid actuated displacement and positioning system as in claim 1 wherein
   (a) a tubular hinge connecting said members with a fluid conduit therethrough and a fluid passage from said conduit to said chamber.

7. A fluid actuated displacement and positioning system as in claim 1 wherein
   (a) the members have recesses therein and the chamber houses in said recess in collapsed condition.

References Cited by the Examiner

UNITED STATES PATENTS

| | | | |
|---|---|---|---|
| 1,295,471 | 2/19 | Fleury | 254—93 |
| 2,226,201 | 12/40 | Freyssinet | 254—93 |
| 2,750,014 | 6/56 | Gordon | 189—36 |
| 2,804,118 | 8/57 | Bayerkohler | 254—93 |
| 3,090,395 | 5/63 | Weiss et al. | 92—39 |

FOREIGN PATENTS

| | | |
|---|---|---|
| 807,389 | 10/36 | France. |
| 835,142 | 5/60 | Great Britain. |

RICHARD B. WILKINSON, *Primary Examiner.*

WILLIAM FELDMAN, *Examiner.*